(12) United States Patent
Akbari et al.

(10) Patent No.: US 12,436,300 B2
(45) Date of Patent: Oct. 7, 2025

(54) PACKAGE IRRADIATION DOSE SENSOR

(71) Applicant: Sartorius Stedim FMT S.A.S., Aubagne (FR)

(72) Inventors: Samin Akbari, Winchester, MA (US); Magali Barbaroux, La Destrousse (FR); Samuel Dorey, Le Beausset (FR); David Pollard, South Boston, MA (US)

(73) Assignee: Sartorius Stedim FMT, Aubagne (FR)

( * ) Notice: Subject to any disclaimer, the term of this patent is extended or adjusted under 35 U.S.C. 154(b) by 131 days.

(21) Appl. No.: 18/268,428

(22) PCT Filed: Dec. 21, 2021

(86) PCT No.: PCT/US2021/064557
§ 371 (c)(1),
(2) Date: Jun. 20, 2023

(87) PCT Pub. No.: WO2022/140350
PCT Pub. Date: Jun. 30, 2022

(65) Prior Publication Data
US 2024/0310533 A1 Sep. 19, 2024

Related U.S. Application Data

(60) Provisional application No. 63/128,387, filed on Dec. 21, 2020.

(51) Int. Cl.
*G01T 1/167* (2006.01)
*G01T 1/02* (2006.01)
*G01T 1/24* (2006.01)

(52) U.S. Cl.
CPC .............. *G01T 1/026* (2013.01); *G01T 1/167* (2013.01); *G01T 1/241* (2013.01)

(58) Field of Classification Search
CPC .......... G01T 1/026; G01T 1/167; G01T 1/241
See application file for complete search history.

(56) References Cited

U.S. PATENT DOCUMENTS

| 6,376,845 B1 | 4/2002 | Purtle |
| 2002/0040968 A1 | 4/2002 | Black et al. |

(Continued)

FOREIGN PATENT DOCUMENTS

| CN | 102426378 A | 4/2012 |
| DE | 102015116617 A1 | 3/2017 |

(Continued)

OTHER PUBLICATIONS

Sanusi, O. M. et al., Development of a 2.45 GHZ Antenna for Flexible Compact Radiation Dosimeter Tags, IEE Transactions of Antennas and Propagation, Aug. 2019, pp. 5063-5072, vol. 67, No. 8, 10 pages.

(Continued)

*Primary Examiner* — David P Porta
*Assistant Examiner* — Fani Polyzos Boosalis
(74) *Attorney, Agent, or Firm* — Womble Bond Dickinson (US) LLP

(57) ABSTRACT

A radiation dose sensor that measures a radiation dose of a biocontainer formed for a first material includes a first electrode, a second electrode, and a film. The first electrode has a plurality of first fingers. And the second electrode has a plurality of second fingers. The fingers of the first electrode extend towards and are interdigitated with the fingers of the second electrode that extend towards the first electrode with gaps formed between the first and second fingers. The film coats the interdigitated fingers and is disposed within the gaps. The film is formed of a second material that is similar to the first material that forms the biocontainer.

20 Claims, 5 Drawing Sheets

(56) References Cited

U.S. PATENT DOCUMENTS

| | | | |
|---|---|---|---|
| 2009/0278685 | A1 | 11/2009 | Potyrailo et al. |
| 2010/0175393 | A1 | 7/2010 | Burke et al. |
| 2011/0003279 | A1 | 1/2011 | Patel |
| 2017/0030768 | A1* | 2/2017 | Dardona .................. G01J 1/02 |

FOREIGN PATENT DOCUMENTS

| | | |
|---|---|---|
| WO | 1995011459 A1 | 4/1995 |
| WO | 1997017595 A1 | 5/1997 |
| WO | 2000037966 A1 | 6/2000 |
| WO | 2004027417 A1 | 4/2004 |
| WO | 2004095062 A2 | 11/2004 |
| WO | 2005089402 A2 | 9/2005 |
| WO | 2007018749 A2 | 2/2007 |
| WO | 2009100192 A1 | 8/2009 |
| WO | 2011126725 A1 | 10/2011 |
| WO | 2012036570 A1 | 3/2012 |
| WO | 2014086675 A2 | 6/2014 |
| WO | 2016035060 A1 | 3/2016 |
| WO | 2019034093 A1 | 2/2019 |
| WO | 2020006377 A1 | 1/2020 |
| WO | 2020009930 A1 | 1/2020 |
| WO | 2020258282 A1 | 12/2020 |

OTHER PUBLICATIONS

Application of Sterilization by Gamma Radiation for Single-Use Disposable Technologies in the Biopharaceutical Sector, Pharmaceutical Technology, May 1, 2012, vol. 2012 Supplement, Issue 3, 12 pages.
Mchale, B. P., Low-Cost, Disposable Mems Radiation Detectors Using Gamma-Sensitive Polymers, Calhoun Institutional Archieve of the Naval Postgraduate School, Jun. 2020, pp. 1-100, 100 pages.
Mittal, A. et al, Diacetylene-Based Colorimetric Radiation Sensors for the Detection and Measurement of g Radiation during Blood Irradiation, ACS Omega, 2021, pp. 9482-9491, vol. 6, 10 pages.
Gaston et al., FTIR study of ageing of g-irradiated biopharmaceutical EVA based film, Polymer Degradation and Stability, Apr. 1, 2016, pp. 19-25, vol. 129, 7 pages.
Gaston et al, One year monitoring by FTIR of g-irradiated multilayer film PE/EVOH/PE, Radiation Physics and Chemistry, Mar. 26, 2016, pp. 115-121, vol. 125, 7 pages.
Gaston et al, Impact of g-irradiation, ageing and their interactions on multilayer films followed by AComDim, Analytica Chimica Acta, Jun. 2, 2017, pp. 11-23, vol. 981, 13 pages.
Dorey et al, XPS analysis of PE and EVA samples irradiated at different g-doses, Applied Surface Science, Sep. 21, 2017, pp. 966-972, vol. 427, 7 pages.
Audran et al., Degradation of g-irradiated polyethylene-ethylene vinyl alcoholpolyethylene multilayer films: An ESR study, Polymer Degradation and Stability, Nov. 2, 2015, pp. 169-179, vol. 122, 11 pages.
Dorey et al, Reconciliation of pH, conductivity, total organic carbon with carboxylic acids detected by ion chromatography in solution after contact with multilayer films after g-irradiation, European Journal of Pharmaceutical Sciences, Feb. 23, 2018, pp. 216-226, vol. 117, 11 pages.
Dorey et al, Generation of O2?Permeation Barrier during the Gamma-Irradiation of Polyethylene/Ethylene-Vinyl Alcohol/ Polyethylene Multilayer Film, Industrial & Engineering Chemistry Research, Jul. 16, 2019, pp. 14115-14123, vol. 58, 9 pages.

Dorey et al, Effect of gamma irradiation on the oxygen barrier properties of ethylene vinyl alcohol in ethyl-vinyl acetate/ethylene-vinyl alcohol/ ethyl-vinyl acetate multilayer film, Journal of Applied Polymer Science, Apr. 13, 2020, 8 pages.
Gaston et al, Evaluation of multilayer film stability by Raman spectroscopy after gamma-irradiation sterilization process, Vibrational Spectroscopy, Mar. 5, 2018, pp. 52-59, vol. 96, 8 pages.
Gaston et al, Monitoring of the discoloration on g-irradiated PE and EVA films to evaluate antioxidant stability, Journal of Applied Polymer Science, 2018, 8 pages.
Girard-Perier et al, Mapping the scientific research on the gamma irradiated polymers degradation (1975-2018), Radiation Physics and Chemistry, Nov. 12, 2019, vol. 168, 9 pages.
Harris et al, A Thin Plastic Radiation Dosimeter, International Journal of Applied Radiation and Isotopes, 1961, pp. 114-122, vol. 11, 9 pages.
Kojima et al, The Gamma-ray Response of Clear Polymethylmethacrylate Dosimeter Radix RN15. Applied Radiation and Isotopes, Mar. 23, 1992, pp. 1197-1202, vol. 43, 6 pages.
Dorey et al, Theoretical and Practical Considerations When Selecting Solvents for Use in Extractables Studies of Polymeric Contact Materials in Single-Use Systems Applied in the Production of Biopharmaceuticals, Industrial & Engineering Chemistry Research, Apr. 27, 2018, pp. 7077-7089, vol. 57, 13 pages.
Pahl et al. Development of a Standardized Extractables Approach for Single-Use Components, BioProcess International, Oct. 2018, pp. 3-11, 9 pages.
Judeikis et al., Free Radical Yields in Polytetrafluoroethylene as the Basis for a Radiation Dosimeter, Space and Missile System Organization Air Force System Command, Los Angeles Air Force Station, Feb. 1968, 41 pages.
Nguyen et al., The Ubiquitous Issue of Cross-Mass Transfer: Applications to Single-Use Systems, Molecules, 2019, vol. 24, 31 pages.
Dorey et al, Identification of chemical species created during g-irradiation of antioxidant used in polyethylene and polyethylene-co-vinyl acetate multilayer film, Journal of Applied Polymer Science, May 25, 2020, 20 pages.
Wormuth et al, Visible Particulate Matter in Single-Use Bags from Measurement to Prevention, BioProcess International, Apr. 2019, pp. 50-53, vol. 17, 4 pages.
Industrial Sterilization Process Optimization and Modality Changes, Association for the Advancement of Medical Instrumentation, 2020, 92 pages.
International Preliminary Report on Patentability for PCT/US2021/064557 issued Jun. 13, 2023, 10 pages.
Arshak et al, Portable Real-Time Gamma Radiation Dosimetry System Using MgO and CeO2 Thick Film Capacitors, University of Limerick, Jan. 1, 2015, pp. 137-142, 7 pages.
Pending U.S. Appl. No. 18/268,430, filed Jun. 20, 2023.
Pending U.S. Appl. No. 18/268,431, filed Jun. 20, 2023.
Sandle et al, Application of Sterilization by Gamma Radiation for Single-Use Disposable Technologies in the Biopharmaceutical Sector, Pharmaceutical Technology, May 1, 2012, vol. 36, 12 pages.
International Preliminary Report on Patentability for PCT/US2021/064558, issued Jun. 13, 2023, 12 pages.
International Preliminary Report on Patentability for PCT/US2021/064559, issued Jun. 13, 2023, 8 pages.
European Office Action for EP Application No. 21847602.6 issued Apr. 8, 2024, 10 pages.

* cited by examiner

PACKAGE IRRADIATION DOSE SENSOR

CROSS-REFERENCE TO RELATED APPLICATION

This application is a national stage filing under 35 U.S.C. § 371 of International Patent Application No. PCT/US2021/064557, filed Dec. 21, 2021, the entire contents of which are hereby incorporated by reference.

BACKGROUND

1. Technical Field

The present disclosure relates to sterilization of products and, more specifically, to package or product level irradiation dose sensors.

2. Discussion of Related Art

The preparation, storage, mixing, freezing, transportation, formulation, and filling of biopharmaceutical solutions are performed in sterile single-use packages or biocontainers including, but not limited to, plastic bags, conduits, tubes, hoses, hubs, connectors, or vessels. The sterilization is achievable through ionizing irradiations as γ-rays, e-beam, X-rays that penetrate through parts, plastic or metallic parts, to sterilize the parts by killing microorganisms on or within the parts.

In addition to sterilization, the irradiation of plastic parts can initiate chemical reactions and complex modifications inside the plastic material as well as modifications of the additives of the plastic. The chemical reactions or modifications can cause damage to the plastics themselves. All modifications do not happen at the same dose or to the same extent. Any changes in the received dose by the biocontainers may affect one or different critical quality attribute(s) of the plastics and may affect products stored in or transported through the biocontainers including, but not limited to, Active Pharmaceutical Ingredients (API) (e.g. a protein of interest), bulk drug substances (BDS), or intermediate ingredients.

The dose of radiation is typically measured by a radiation dosimeter. A radiation dosimeter is a device that when irradiated, exhibits a quantifiable change in some property of the radiation dosimeter which can be related to an absorbed dose in a given material.

Typically, during sterilization process, several biocontainers, the same or different, are placed inside large containers moving around a stationary radiation source with the container including one or two radiation dosimeters. It is well known there is significant variation in the radiation dose across the container and consequently the biocontainers enclosed therein.

SUMMARY

This disclosure relates generally to a radiation dose sensor that can be used to predict impact of radiation used to sterilize biocontainers on the material of the biocontainer. This information may be used to determine the potential impact of the changes in the material on the products stored in or transported through the biocontainers.

The radiation dose sensors detailed herein include a film formed of a material that is the main component of an associated biocontainer. In some embodiments, the film is formed of the same material that forms associated biocontainer(s) such that the film of the sensor absorbs a similar amount of radiation as the associated biocontainer(s) and is affected in a manner similar to the associated biocontainer(s). This is unlike prior radiation dosimeters that are typically formed of materials different or discrete from the materials of the biocontainer(s) and are related to the absorbed dose of the material of the biocontainer(s). For this reason, the impact of the radiation dose on a biocontainer can be predicted accurately when the dosimeter is formed of a material similar to the associated biocontainer. In addition, the related dose of radiation calculated by prior art dose sensors may be more or less than the actual radiation absorbed by the material of the biocontainer(s). Thus, a radiation dose sensor that is formed of a material similar to the associated biocontainer(s) may provide a more accurate measurement of radiation absorbed by the associated biocontainers. This more accurate measurement of radiation absorbed by the associated biocontainer may allow for a more accurate prediction of the effect of the absorbed radiation on the biocontainer(s).

In addition, the container may include multiple types of biocontainer(s) formed of different materials that are disposed within the container. As the prior art containers may only include one or two radiation dose sensors, it may be difficult to determine the dose absorbed by a particular biocontainer within the container. The radiation dose sensors detailed herein are low-cost, single use radiation dose sensors that are formed of a material similar to the material of the associated biocontainer(s). Thus, a separate radiation dose sensor can be associated with each biocontainer or each type or biocontainer in the container such that a measurement of absorbed radiation of each biocontainer or type of biocontainer in the container can be accurately measured. Measuring a radiation dose on each biocontainer and/or each type of biocontainer within the container may allow for more accurate measurement of the effect of radiation on the biocontainers. The radiation dose of each biocontainer may be used to predict the impact of the sterilization on the products stored or transported through the biocontainers. The impact of the sterilization may be used to predict the degradation of products transported through or stored in the biocontainers.

In an embodiment aspect of the present disclosure, a radiation dose sensor that measures a radiation dose of a biocontainer formed for a first material includes a first electrode, a second electrode, and a film. The first electrode has a plurality of first fingers. And the second electrode has a plurality of second fingers. The fingers of the first electrode extend towards and are interdigitated with the fingers of the second electrode that extend towards the first electrode with gaps formed between the first and second fingers. The film coats the interdigitated fingers and is disposed within the gaps. The film is formed of a second material that is similar to the first material that forms the biocontainer.

In embodiments, the sensor includes a backing material that is configured to secure the first electrode relative to the second electrode. The sensor may be configured to provide measurements of an electrical property through the film. The second film may include nanoparticles that are configured to enhance a sensitivity of the electrical property of the sensor. The sensor may be configured to measure a capacitance of the electrodes or may be configured to measure a resistance between the electrodes through the film.

In some embodiments, the sensor includes support electronics that are configured to store measurements, transmit measurements, or take measurements with the sensor.

In certain embodiments, the sensor may form a portion of the biocontainer. The second material may be ethylene-vinyl acetate (EVA), ethylene vinyl alcohol (EVOH), low-density polyethylene (LDPE), linear low-density polyethylene (LLDPE), nylon plastic (PA), polyethylene terephthalate (PET), fluoropolymers, polyvinyl chloride (PVC), thermoplastic polyurethane (TPU), platinum cured silicone Si(pt), liquid silicone rubber Si(LSR), fluoropolymers, thermoplastic elastomers (TPE), high-density polyethylene (HDPE), polypropylene (PP), polycarbonate (PC), polysulfone (PSU), polyphenylsulfone (PPSU), polybutylene terephthalate (PBT), polyetheretherketone (PEEK), polyoxymethylene (POM), acrylonitrile butadiene styrene (ABS), silicone (Si), ethylene propylene diene terpolymer (EPDM), thermoplastic vulcanizates (TPV), acrylate, and cynate.

In another embodiment of the present disclosure, a method of manufacturing a radiation dose sensor includes interdigitating fingers of a first electrode with fingers of a second electrode and coating the interdigitated fingers with a second material to form a film over the interdigitated fingers. The film is disposed within gaps defined between the fingers of the first electrode and the fingers of the second electrode. The material of the film is selected to be similar to a material forming a biocontainer associated with the sensor.

In embodiments, coating the interdigitated fingers includes forming a wall of a biocontainer with the interdigitated fingers embedded within the wall of the biocontainer.

In another embodiment of the present disclosure, a kit includes a package, a first sterilized biocontainer, and a first sensor. The first sterilized biocontainer is disposed in the package and is formed of a first material. The first sensor is disposed in the package and includes a first electrode, a second electrode, and a film. The first electrode has a plurality of first fingers. The second electrode has a plurality of second fingers. The plurality of first fingers extend from the first electrode towards the second electrode. The plurality of second fingers extend from the second electrode towards the first electrode such that the first fingers are interdigitated with the second fingers such that gaps are defined between the first and second fingers. The film coats the plurality of first fingers and the plurality of second fingers such that the film is disposed within the gaps. The film is formed of the first material forming the biocontainer.

In some embodiments, the kit includes a second biocontainer disposed within the package. The second biocontainer may be formed of the first material. The first biocontainer may be a film, a bag, a tube, a hose, a conduit, a connector, an O-ring, or an adhesive.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
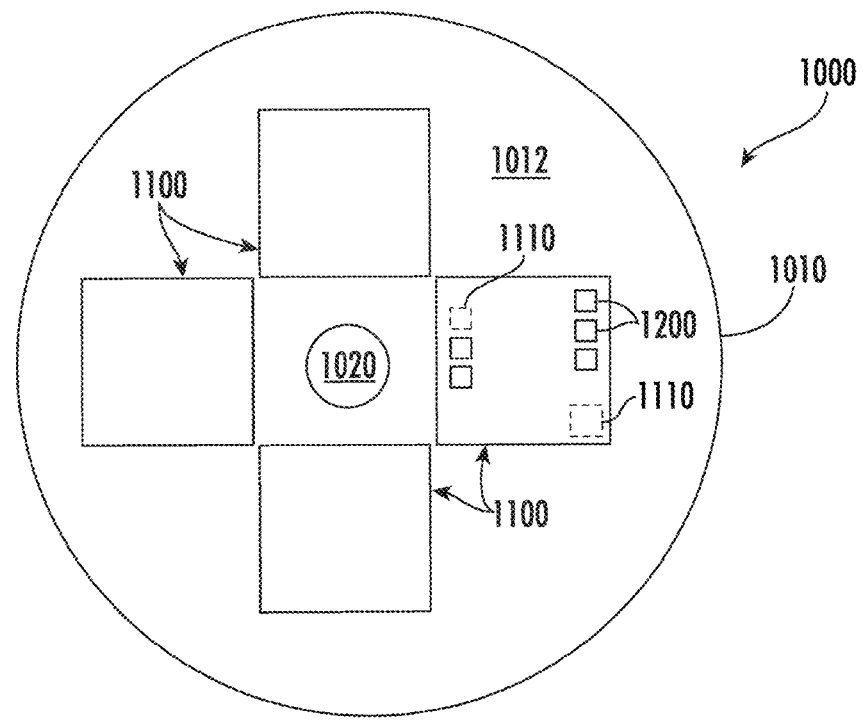
FIG. 1 is a top schematic view of a sterilization apparatus for biocontainers.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 2:
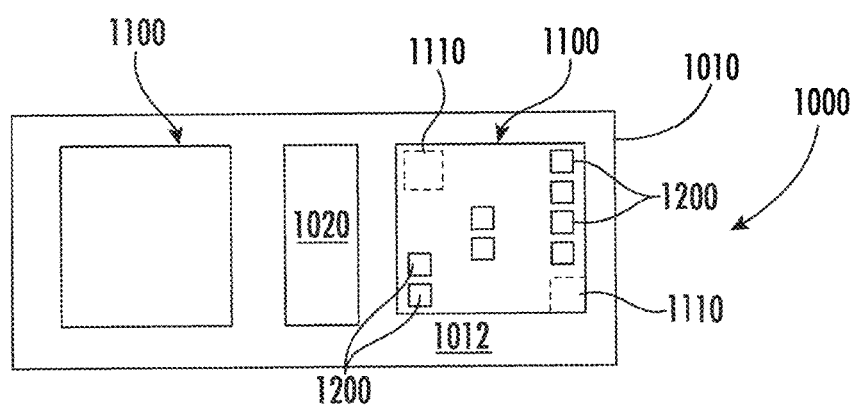
FIG. 2 is a side schematic view of the sterilization apparatus of FIG. 1.

Referring now to FIGS. 1 and 2, an apparatus for sterilization of biocontainers is illustrated and generally referred to as apparatus 1000. The apparatus 1000 includes an outer wall 1010 and a radiation source 1020. The outer wall 1010 encapsulates a chamber 1012 and shields an environment outside of the apparatus 1000 from radiation provided by the radiation source 1020.

To sterilize biocontainers, biocontainers 1200 can be loaded into one or more containers 1100. The containers 1100 are positioned within the chamber 1012 with one or more radiation sensors 1110 disposed within the container 1100. The radiation source 1020 is then placed in an irradiation configuration or activated to emit radiation in the form of γ-rays, e-beam, X-rays, or other form of sterilizing radiation. The radiation passes through the containers 1100 and the biocontainers 1200 to sterilize the materials forming the biocontainers 1200. The radiation sensors 1110 measure a dose of radiation at the locations within the container 1100. It is known that the radiation within the containers 1100 may vary greatly depending on the location of the biocontainer 1200 within the container 1100 and the other biocontainers 1200 within the container 1100. In addition, the material forming one biocontainer 1200 may differ from the material forming another biocontainer 1200. This variation in materials may also affect the dose deposition of radiation absorbed by the different biocontainers 1200. It has been shown that the dose of radiation absorbed during sterilization can affect the performance of the biocontainers 1200. In some embodiments, biocontainers 1200 can be placed on a conveyor that passes by the radiation source 1020.

Figure 3:
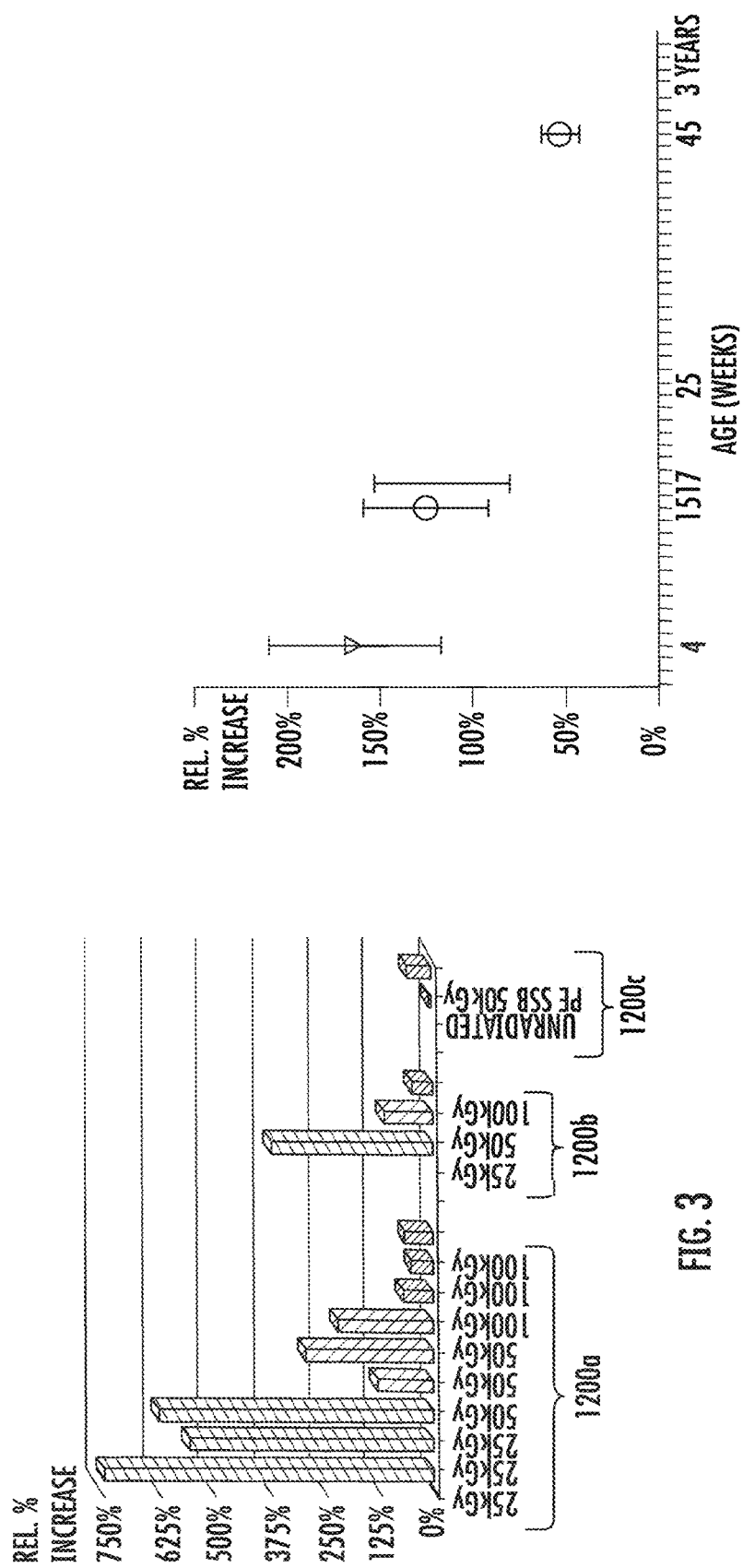
FIG. 3 is a chart showing empirical data of an increase in oxidation of a product in plastic bags which has been exposed to varying doses of radiation.
Figure 5:
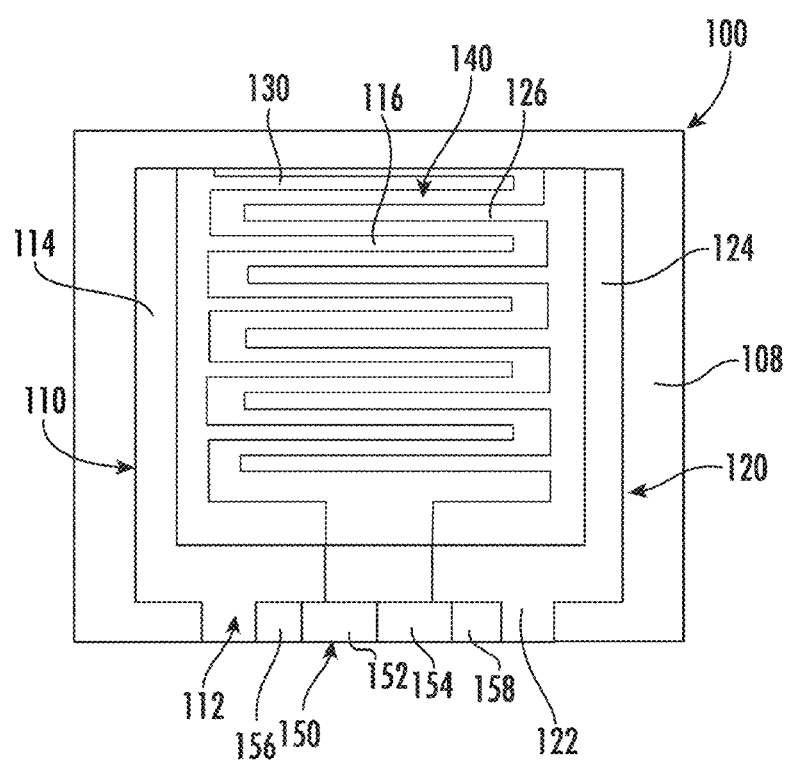
FIG. 5 is a top view of an embodiment of a radiation dose sensor provided in accordance with the present disclosure.

Referring to FIG. 3, it has been shown that after sterilization, an amount of amino-acid oxidation in the biocontainers 1200 can be affected by the dose of radiation received during sterilization. As shown, when a particular biocontainer receives an increased radiation dose, the amount of amino-acid oxidation decreases as the amount of the radiation dose increases. For example, when a particular biocontainer 1200*a* receives 25 KiloGray (kGy), there is 500% to 750% increase in amino-acid oxidation; when 50 kGy is received, there is a 120% to 275% in amino-acid oxidation; and when 100 kGy is received, there is less than a 100% increase in amino-acid oxidation. This is confirmed with another biocontainer 1200*b* having a 350% increase when exposed to 25 kGy, a 100% increase when exposed to 50 kGy, and 50% increase when exposed to 100 kGy. This is contrary to the accepted thought that the higher the dose of radiation the more damage would be done to the material and thus, the oxidation of amino-acids would be increased. Specifically, conventional thought was that the higher the dose of radiation, the more damage, e.g., oxidation and creation of free radicals, would occur; however, this is contrary to what is shown in FIG. 5 where the lower the radiation dose, the more amino-acid oxidation occurs in the single-use biocontainers.

Further, FIG. 3 also shows that the material forming the biocontainer may affect the dose on the biocontainer. For example, the first biocontainer 1200*a* was affected to a greater extent than the second biocontainer 1200*b* and that a third biocontainer 1200*c* was affected less than the second biocontainer 1200*b*. Thus, the effect of the dose may be dependent on the amount of the dose and the type of material receiving the dose.

One explanation of the increase in amino-acid oxidation is that the increased oxidations may be the result of free radicals being created as a result of the irradiation of the biocontainers. Specifically, radiation-sterilization of biocontainers may cause complex modifications inside the materials, leading to modifications of the additives or to damage in the polymers themselves. For example, irradiation of biocontainers may initiate chemical reactions inside the plastic material leading to either an increase or a decrease in the molecular weight of the polymers. These modifications may induce the formation of radical species at the surface and in the core of the material. The radical species can be generated despite the presence of antioxidants in the films as the radical species should be quickly scavenged by the antioxidants present within the materials. The presence of free radical species in the materials of biocontainers after irradiation has been shown with Electron Spin Resonance (ESR). Competition between the free radical scavenging by antioxidants and the reaction of oxidation with the hydrocarbon chains may result in the presence of oxygen containing organic molecules. This competition may depend on the γ-irradiation dose rate. It is contemplated that the direct availability of oxygen and antioxidants may also affect this competition.

Figure 4:
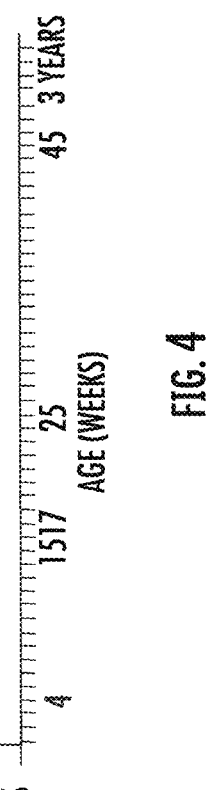
FIG. 4 is a chart showing empirical data of an increase in oxidation of a product in plastic bags at intervals of storage after sterilization.

With additional reference to FIG. 4, the passage of time from the irradiation may reduce an amount of protein oxidation for the materials of the single-use biocontainers. The decrease in protein oxidation may be the result of free radicals dissipating after being created during irradiation. As shown in FIG. 4, for a biocontainer 1200, the relative increase in protein oxidation may be in a range of 125% to 225% after 4 weeks, with a decline to 90% to 165% after 15 weeks, a decline to 80% to 150% after 17 weeks, and a reduction to 50% after 45 weeks. Thus, the amount of time after irradiation can be significant in reducing the oxidation of proteins eventually stored in the biocontainers. This amount of time may be characterized as ageing time.

As detailed above, the effect of irradiation of a biocontainer to sterilize the biocontainer is dependent on the dose of radiation received by the material of the biocontainer and the material of the biocontainer. Thus, a dose sensor formed of a material similar to that of an associated biocontainer will allow precise prediction of the change impact of the radiation received by the material of the associated biocontainer and consequently the change impact of the radiation received on ingredients subsequently stored in the associated biocontainer. A dose sensor formed of a material similar to that of an associated biocontainer may allow for an improved prediction of the performance of the associated biocontainer after sterilization. Thus, a dose sensor that accurately measures a dose of a particular biocontainer may allow for improved prediction of the performance of the biocontainer after sterilization. Traditionally, to measure the radiation absorbed by a biocontainer, type I or type II dosimeters have been used. With respect to type I dosimeter, the response of type I dosimeters must be adjustable for the effects of relevant influence quantities (temperature, dose rate, etc.) by applying independent corrections. Type I dosimeters may utilize the Fricke solution which uses spectrophotometric evaluation such as an alanine dosimeter with electron paramagnetic resonance (EPR) analysis, the dichromate solution with spectrophotometric evaluation, the ceric-cerous solution with either spectrophotometry or potentiometry, or the ethanol-chlorobenzene solution with titration analysis to determine the radiation dose absorbed during radiation. Independent correction factors are not practical with type II dosimeters due to the influence of factors related to the radiation dose including temperature and dose rate. For this reason, type II dosimeters include process calorimeters, cellulose triacetate, lithium fluoride containing polymer matrix (photofluorescent), Perspex systems, and radiochromic films and liquids. Thus, type II dosimeters are not practical to be used directly on bags and films. In addition, the correction process for type I and type II requires waiting several hours after radiating the sensors using UV-VIS, FTIR, or spectrometry equipment making it impossible to detect dose changes in real-time.

Referring now to FIG. 5, a radiation dose sensor 100 is provided in accordance with the present disclosure. As detailed herein, the radiation dose sensors disclosed herein allow for real-time measurement of a radiation absorbed during sterilization and the effect of the radiation on the material of a particular biocontainer. The radiation dose sensors allow for the prediction of a change in concentration of protein or other formulation buffer components due to absorption, migration of free radicals from the biocontainers to products within that may cause a potential pH shift within the products which result from protein aggregation, chemical modification, or introduction of leachable compounds within the materials forming the biocontainers. The radiation dose sensors disclosed herein allow for radiation dose readings at the level of each package or biocontainer within the container as opposed to the container level of previous sensors detailed above, e.g., sensor 1100 (FIG. 1). As used herein, the term "package" describes a shipping package of one or more biocontainers. A package may be a cardboard box or a plastic tote that acts as a shipping unit for one or more biocontainers. A package may be referred to as a case.

In addition, the radiation dose sensors detailed herein may be suitable in a wide range of radiation doses, e.g., in a range of 10 Gy to 150 kGy, and a wide range of radiation energies and wavelengths, e.g., 100 keV to 10 MeV. Further, the radiation dose sensors detailed herein may account for environmental factors and must work in all irradiation factors including, but not limited to, as temperature, dose rate, percent of dose absorbed per hour, Grays per hour, and radiation type.

The sensor 100 includes a first electrode 110, a second electrode 120, and a polymer film 130. The first and second electrodes 110, 120 include connectors 112, 122 and an arm 114, 124. The arms 114, 124 include fingers 116, 126 that extend from one arm 114, 124 towards the other arm 114, 124. The fingers 116, 126 of one arm 114, 124 interdigitate with the fingers 116, 126 of the other arm 114, 124.

The polymer film 130 is applied over the fingers 116, 126 such that the first and second electrodes 110, 120 are secured to one another with a space or a gap 140 between the interdigitated fingers 116, 126. The polymer film 130 fills the gap 140 between the interdigitated fingers 116, 126. The polymer film 130 may be a thin layer of polymer in a range of 20 μm to 300 μm. In some embodiments, the polymer film 130 has a thickness less than 20 μm and in certain embodiments, the polymer film 130 has thickness greater than 300 μm.

The gap 140 and the material of the polymer film 130 results in a measurable electrical property of the sensor 100. The electrical property of the sensor 100 may be electrical resistance between the electrodes 110, 120 or may be a capacitance of the electrodes 110, 120. The electrical property of the electrodes 110, 120 can be used to determine properties of the polymer film 130. For example, a change in the electrical property can be used to measure degradation of the film 130 as a result of one or more factors including irradiation. The degradation of the film 130 may be used to determine a radiation dose absorbed by the film 130 during irradiation. In some embodiments, the electrical property can be used to determine when the film 130 has stabilized after irradiation.

The polymer film 130 is selected to match the polymer of an associated biocontainer. In some embodiments, the sensor 100 is integrated into or embedded in a biocontainer, e.g., biocontainer 1200, such that the polymer film 130 is a material forming the biocontainer with the electrodes 110, 120 disposed in a surface of the biocontainer. In embodiments, the biocontainer 1200 may be a film, a bag formed of a film, a tube, a conduit, a connector, an O-ring, an adhesive, or other element that is configured to contact a product during production, storage, transportation, or use of a product. For example, the biocontainer 1200 may be film or bag formed of ethylene-vinyl acetate (EVA), ethylene vinyl alcohol (EVOH), low-density polyethylene (LDPE), linear low-density polyethylene (LLDPE), nylon plastic (PA), polyethylene terephthalate (PET), other polyesters, fluoropolymers, polyvinyl chloride (PVC), or thermoplastic polyurethane (TPU); may be a tube formed of platinum cured silicone Si(pt), liquid silicone rubber Si(LSR), PVC, EVA, fluoropolymers, or thermoplastic elastomers (TPE); may be a connector or other plastic part formed of high-density polyethylene (HDPE), LDPE, LLDPE, EVA, polypropylene (PP), polycarbonate (PC), polysulfone (PSU), polyphenylsulfone (PPSU), PET, polybutylene terephthalate (PBT), other polyesters, polyetheretherketone (PEEK), polyoxymethylene (POM), or acrylonitrile butadiene styrene (ABS); may be a seal or O-ring formed of silicone (Si), ethylene propylene diene terpolymer (EPDM), thermoplastic vulcanizates (TPV) or other rubbers; or may be an adhesive formed of acrylate or cynate.

The polymer film 130 may include conductive particles 132 distributed therein to enhance measurability of the electrical property of the polymer film 130, e.g., the electrical resistance or capacitance thereof. For example, conductive particles 132 may enhance a sensitivity of measurements of the electrical property of the film 130. The conductive particles 132 may be nanoparticles including, but not limited to, carbon nanotubes or silver nanoparticles. When the sensor 100 is embedded in or integrated into a biocontainer, the conductive particles 132 may be added to a portion of the biocontainer including the sensor 110 or may be distributed through the entire biocontainer.

In certain embodiments, the sensor 100 includes integrated electronics 150 to support the sensor 100. The integrated electronics 150 may include memory 152 that is configured to store data with respect to a measured electrical property of the sensor 100. The integrated electronics 150 may include an antenna or transmitter 154 that is configured to transmit data via a mode of near field communication (NFC) protocol including, but not limited to, WiFi, Bluetooth, RFID, or Z-wave. The integrated electronics 150 may include a controller 156 that is programmed to take a measurement of the electrical property of the sensor 100 at a given time, store the measurement with the associated item, or transmit the measurements at a given time or in response to a signal received via the antenna or transmitter 154. The integrated electronics 150 may include a power supply 158 that is configured to provide electrical energy to other components of the integrated electronics including, but not limited to, the memory 152, the transmitter 154, or the controller 156. The integrated electronics 150 may be flexible or rigid.

Figure 6:
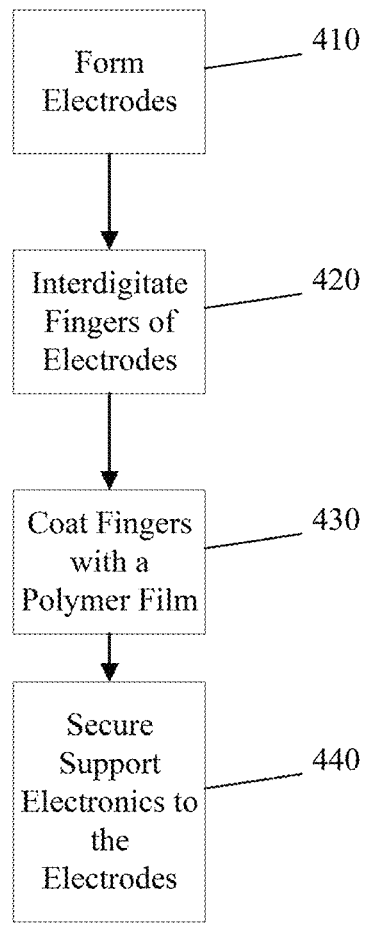
FIG. 6 is a flow chart of a method of manufacturing the radiation dose senor provided in accordance with embodiments of the present disclosure.

With reference to FIG. 6, a method 400 of manufacturing the sensor 100 is disclosed in accordance with the present disclosure and with reference to the sensor 100 of FIG. 5. The electrodes 110, 120 are formed from a variety of known methods including stamping, vapor deposition, additive manufacturing, forging, or casting (Step 410). In some embodiments, a biocontainer may become damaged in a manner such that the electrodes 110, 120 contact contents of the biocontainer, and thus, the electrodes 110, 120 may be formed of a conductive material that may come into contact with the product of the biocontainer. Thus, the conductive material of the electrodes 110, 120 may be selected to prevent protein aggregation, chemical modification of the products, or to prevent undesirable leachable compounds into the product. The electrodes 110, 120 may be formed of copper, steel, surgical steel, silver, gold, or carbon-based materials (carbon nanotubes, graphene, carbon nanoparticles).

The electrodes 110, 120 are positioned on a backing or support material such that the fingers 116 of the first electrode 110 are interdigitated with the fingers 126 of the second electrode 120 (Step 420). The backing material 108 may be formed of a plastic that is configured to support the electrodes 110, 120 in position relative to one another. The backing material 108 may form part of the completed sensor 100 or may be separated after deposition of the film 130 as detailed below. When the backing material 108 forms part of the completed sensor 100, the backing material 108 maybe nonconductive and not disposed within the gaps 140 between the fingers 116, 126 such that measurements of resistance or capacitance are not affected by the presence of the backing material 108.

With the electrodes 110, 120 positioned relative to one another, the fingers 116, 126 of the electrodes 110, 120 are coated with the polymer film 130 (Step 430). The coating of the fingers 116, 126 may be completed by drop casting, injection molding, a doctor blade process, or another suitable process for coating the fingers 116, 126 with a film in a range of 20 µm to 300 µm. As detailed above, the polymer film 130 may be the same material as an associated biocontainer. In some embodiments, the electrodes 110, 120 are embedded within the associated biocontainer such that electrodes 110, 120 are coated with the polymer film 130 when the walls of the biocontainer are formed. In certain embodiments, the electrodes 110, 120 are applied to an interior or exterior surface of a biocontainer such that the material of the surface of the biocontainer is within the gaps 140 of the sensor 100. For example, when the biocontainer is a vessel, the polymer film 130 may be a wall of the vessel with the electrodes 110, 120 are embedded within the wall of the vessel. In certain embodiments, the backing material 108 is a wall of the biocontainer and the polymer film 130 is coated over the electrodes 110, 120 to secure the electrodes 110, 120 to the biocontainer. When the sensor 100 is outside of a biocontainer, it may be packaged with or without the backing material 108 to form a completed sensor 100.

In some embodiments, the sensor 100 is paired with support electronics 150 that are secured to the electrodes 110, 120 (Step 440). The support electronics 150 may be configured to power, measure, and/or store properties of the polymer film 130 before, during, and/or after irradiation of the sensor 100 as described in detail below.

Figure 7:
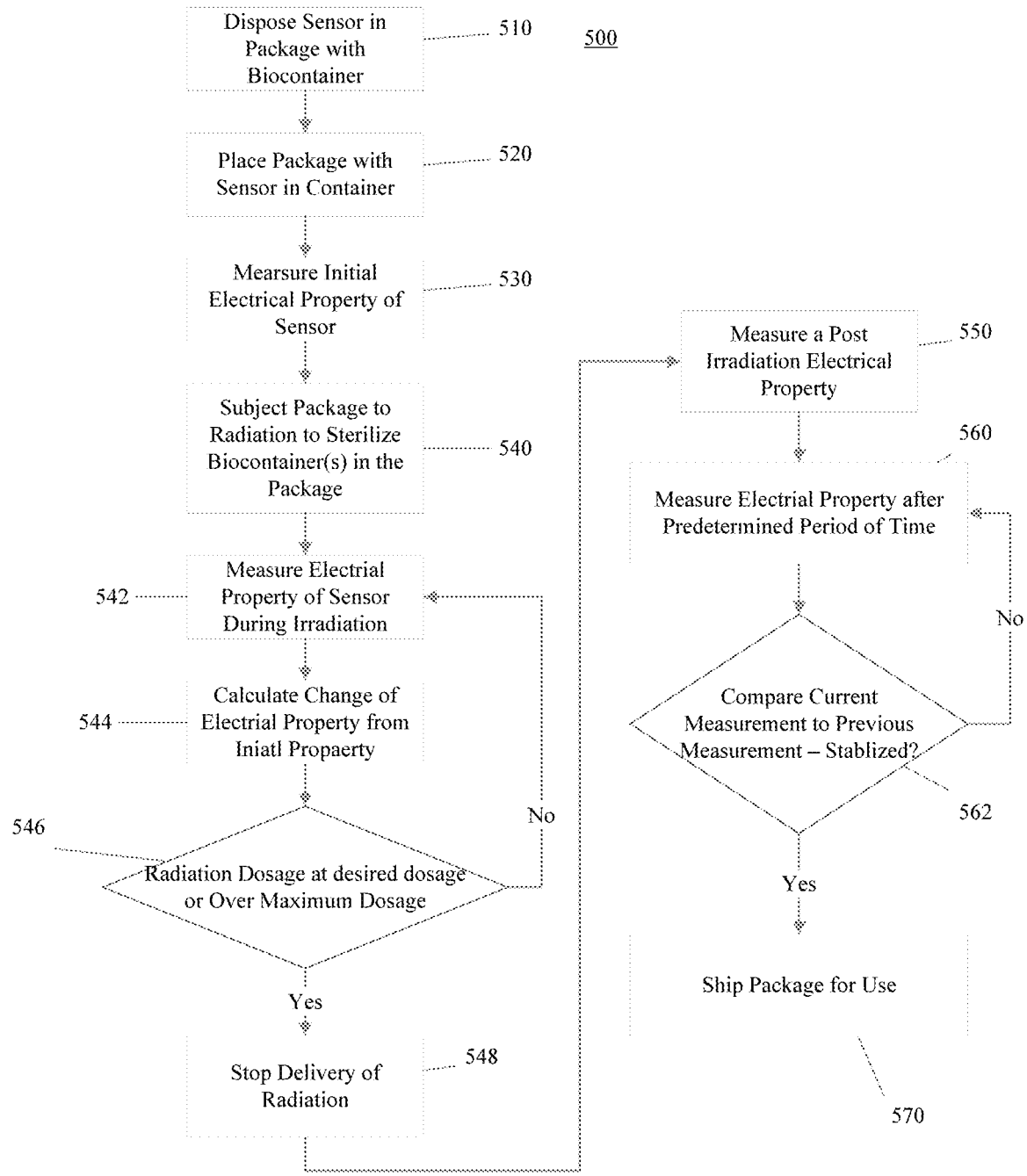
FIG. 7 is a flow chart of a method of determining a radiation dose of a biocontainer in accordance with embodiments of the present disclosure.

Referring now to FIG. 7, a method 500 of measuring an irradiation dose and the modification or damage to a material of a biocontainer is disclosed in accordance with the present disclosure with reference to the sensor 100 of FIG. 5 and the apparatus 1000 of FIGS. 1 and 2. With respect to method 500, the sensor 100 may be a sensor formed with a biocontainer or may be a sensor disposed in a package with one or more biocontainers. The sensor 100 is disposed in a package with one or more biocontainers (Step 510), the film 130 of the sensor 100 is formed of the same or similar material of the biocontainers within the package therewith. The package may include one or more sensors 100. With the sensor 100 disposed within the package, the package is placed into a container suitable for irradiation (Step 520), e.g., the package is placed into the container 1100. The container may include a plurality of packages with each package having similar biocontainers or different biocontainers. Each of the plurality of packages in the container may have one or more sensors that include a film, e.g., film 130, formed of a material similar to a material of the biocontainers in the package therewith.

With the package containing the sensor 100 placed in the container 1100, an initial electrical property of the sensor 100 is taken with the sensor 100 (Step 530). The electrical property may be a resistance between the electrodes 110, 120 of the sensor 100 and/or may be a capacitance of the electrodes 110, 120. The electrical property is used to quantify the state of the material of the film 130 of the sensor 100, and thus quantify the state of the material of the biocontainer in the package with the sensor 100, before irradiation of the package including the sensor 100 and the biocontainer. The measurement may be transmitted to a controller outside of the container 1100 or may be stored in support electronics 150 of the sensor 100. The initial electrical property can be store as a pre-irradiation state of the film 130. The initial electrical property can be measured before the package including the sensor 100 and the biocontainer is loaded into the container 1100.

With the package including the sensor 100 and the biocontainer is disposed in the container 1100, the container 1100 is subjected to radiation from a radiation source such as radiation source 1020 (Step 540). During delivery of radiation, the sensor 100 may provide measurements of the electrical property to the controller outside of the container 1100 (Step 542). The controller outside the container may calculate a change in the electrical property during irradiation of the container (Step 544). The change in the electrical property from the initial electrical property may be used to determine a dose of radiation absorbed by the film 130, and thus a dose of radiation absorbed by the material of the biocontainer in the package with the sensor 100. The sensor 100 may provide measurements to the controller in real-time such that measurements of the sensor 100 can be used to control a duration of exposure to the radiation source 1020. Transmission of signals from the sensor 100 to the controller outside of the container may be direct to the controller outside of the container 1100 or to an intermediate antenna, relay, or controller of the container 1100 which then transmits the signal from the sensor 100 to the controller outside of the container 1100. The intermediate antenna, relay, or controller of the container 1100 may be in communication with multiple sensors, e.g., sensor 100, within the container 1100 and send a single consolidated signal to the controller outside of the container 1100 including the data of the multiple sensors. The controller outside of the container 1100 may terminate delivery of radiation when all of the sensors within the container 1100, e.g., sensor 100, are at or above a desired dose of radiation or when one or more sensors within the container 1100 reach a maximum dose of radiation (Step 546). When the desired dose is reached or the maximum dose is reached, delivery of radiation is terminated (Step 548). In some embodiments, the real-time measurements of the sensor 100 may be taken continuously or at predetermined intervals during delivery of radiation. In certain embodiments, the real-time measurements of the sensor 100 are taken between cycles of delivery of radiation. Taking the real-time measurements between cycles of delivery of radiation may increase the accuracy of a measurement as a result of a reduction in interference from active gamma irradiation.

After delivery of radiation is completed, the sensor 100 may provide a measurement of the electrical property to quantify the state of the film 130 of the sensor after irradiation (Step 550). The change in the electrical property from the initial electrical property may be used to determine a dose of radiation absorbed by the sensor 100 and thus, the biocontainer or biocontainers associated with the sensor 100. The measurement of the electrical property after irradiation may be stored as a post irradiation electrical property. The change from the initial electrical property to the post irradiation electrical property may be used to determine modification of the material of the film 130 or the formation of free radicals as a result of the irradiation. Additionally or alternatively, this change may be used to calculate an aging time of the biocontainer or biocontainers in the package with the sensor 100 before use of the biocontainer(s). The aging time may be an amount of time for the material of the film 130 to stabilize after irradiation as detailed above with respect to FIG. 4.

In certain embodiments, the sensor 100 may provide a measurement of the electrical property to periodically quantify the state of the film 130 after irradiation such that sensor 100 may be used to determine when the material of the film 130 has stabilized (Step 560). For example, when the change in the electrical property stabilizes, e.g., does not change significantly, for a predetermined number of periods, the material of the film 130 can be considered to have stabilized (Step 562). The change in the electrical property may be averaged over multiple readings. Storing the biocontainer(s) associated with the sensor 100 until the sensor 100 stabilizes may reduce degradation of products contacting the materials of the biocontainer(s). When the electrical property stabilizes, the package of biocontainers may be shipped or placed into use (Step 570).

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A radiation dose sensor for measuring a radiation dose of a biocontainer formed of a first material, the radiation dose sensor comprising:
   a first electrode having a plurality of first fingers;
   a second electrode having a plurality of second fingers, the plurality of first fingers extending from the first electrode towards the second electrode, the plurality of second fingers extending from the second electrode towards the first electrode such that the first fingers are interdigitated with the second fingers with gaps defined between the first fingers and the second fingers; and
   a film coating the plurality of first fingers and the plurality of second fingers such that the film is disposed within the gaps, the film formed of a second material similar to the first material forming the biocontainer, the film configured to degrade when exposed to radiation to determine a radiation dose of the sensor.

2. The radiation dose sensor according to claim 1, further comprising a backing material configured to secure the first electrode relative to the second electrode.

3. The radiation dose sensor according to claim 1, wherein the radiation dose sensor is configured to provide measurements of an electrical property through the film.

4. The radiation dose sensor according to claim 3, wherein the second material includes nanoparticles configured to enhance a sensitivity of the electrical property of the radiation dose sensor.

5. The radiation dose sensor according to claim 1, wherein the radiation dose sensor is configured to measure a capacitance between the first electrode and the second electrode.

6. The radiation dose sensor according to claim 1, wherein the radiation dose sensor is configured to measure a resistance through the film.

7. The radiation dose sensor according to claim 1, further comprising support electronics configured to store measurements, transmit measurements, or take measurements with the radiation dose sensor.

8. The radiation dose sensor according to claim 1, wherein the film forms a portion of the biocontainer.

9. The radiation dose sensor according to claim 1, wherein the second material is selected from the group consisting of ethylene-vinyl acetate (EVA), ethylene vinyl alcohol (EVOH), low-density polyethylene (LDPE), linear low-density polyethylene (LLDPE), nylon plastic (PA), polyethylene terephthalate (PET), fluoropolymers, polyvinyl chloride (PVC), thermoplastic polyurethane (TPU), platinum cured silicone Si (pt), liquid silicone rubber Si (LSR), fluoropolymers, thermoplastic elastomers (TPE), high-density polyethylene (HDPE), polypropylene (PP), polycarbonate (PC), polysulfone (PSU), polyphenylsulfone (PPSU), polybutylene terephthalate (PBT), polyetheretherketone (PEEK), polyoxymethylene (POM), acrylonitrile butadiene styrene (ABS), silicone (Si), ethylene propylene diene terpolymer (EPDM), thermoplastic vulcanizates (TPV), acrylate, and cynate.

10. The radiation dose sensor according to claim 1, wherein the radiation dose sensor is configured to provide measurements between cycles of delivery of radiation.

11. A method of manufacturing a radiation dose sensor, the method comprising:
    interdigitating fingers of a first electrode with fingers of a second electrode; and
    coating the interdigitated fingers with a material to form a film over the interdigitated fingers such that the film is disposed within gaps defined between the fingers of the first electrode and the fingers of the second electrode, the material of the film being selected to be similar to a material forming a biocontainer associated with the radiation dose sensor, the film configured to degrade when exposed to radiation to measure a dose of radiation.

12. The method according to claim 11, wherein coating the interdigitated fingers includes forming a wall of a biocontainer with the interdigitated fingers embedded within the wall of the biocontainer.

13. The method according to claim 11, further comprising disposing nanoparticles within the gaps defined between the fingers of the first electrode and the fingers of the second electrode.

14. A method of predicting a change impact of a biocontainer due to irradiation thereof, the method comprising:
    associating a radiation dose sensor with a biocontainer, the radiation dose sensor including a film formed of a material similar to a material forming the associated biocontainer;
    irradiating the radiation dose sensor and the biocontainer such that the film degrades; and
    predicting the change impact of irradiation on the biocontainer based on the irradiation of the radiation dose sensor.

15. The method according to claim 14, further comprising:
    storing products in the biocontainer after irradiation of the biocontainer; and
    correlating a change impact to the change impact of the irradiation on the biocontainer to the products stored within the biocontainer.

16. The method according to claim 14, further comprising measuring a change in properties of the radiation dose sensor over time after irradiation of the radiation dose sensor.

17. The method according to claim 16, further comprising:
    storing products within the biocontainer; and
    correlating the change in properties of the radiation dose sensor over time to products stored in the biocontainer.

18. A kit comprising:
    a package;
    a first sterilized biocontainer disposed in the package, the first sterilized biocontainer formed of a first material; and a first sensor disposed in the package, the first sensor comprising:
a first electrode having a plurality of first fingers;
a second electrode having a plurality of second fingers, the plurality of first fingers extending from the first electrode towards the second electrode, the plurality of second fingers extending from the second electrode towards the first electrode such that the first fingers are interdigitated with the second fingers with gaps defined between the first and second fingers; and
a film coating the plurality of first fingers and the plurality of second fingers such that the film is disposed within the gaps, the film formed of the first material forming the first sterilized biocontainer, the film configured to degrade when exposed to radiation to determine a radiation dose of the sensor.

19. The kit according to claim 18, further comprising a second sterilized biocontainer disposed within the package, the second sterilized biocontainer formed of the first material.

20. The kit according to claim 18, wherein the first sterilized biocontainer is selected from the group consisting of a film, a bag, a tube, a conduit, a connector, an O-ring, or an adhesive.

* * * * *